(12) United States Patent
Yamaguchi et al.

(10) Patent No.: US 7,480,557 B2
(45) Date of Patent: Jan. 20, 2009

(54) CONTROL SYSTEM FOR INTERNAL COMBUSTION ENGINE

(75) Inventors: Satoshi Yamaguchi, Wako (JP);
Mamoru Hasegawa, Wako (JP); Hideki Sakamoto, Wako (JP); Naoto Kitayama, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/976,659

(22) Filed: Oct. 26, 2007

(65) Prior Publication Data
US 2008/0120013 A1    May 22, 2008

(30) Foreign Application Priority Data
Nov. 17, 2006   (JP)   .............................. 2006-311135

(51) Int. Cl.
*F02D 41/30*    (2006.01)
*G06F 19/00*    (2006.01)
*F02M 25/07*    (2006.01)
*F02B 47/08*    (2006.01)

(52) U.S. Cl. .................. 701/104; 701/103; 701/108; 123/299

(58) Field of Classification Search .............. 701/101, 701/102, 103, 104, 105, 108, 109, 115; 123/299, 123/436, 568.11, 568.21
See application file for complete search history.

(56) References Cited

U.S. PATENT DOCUMENTS

| 5,111,405 | A | * | 5/1992 | Maeda et al. | ............... 701/110 |
| 5,215,053 | A | * | 6/1993 | Ito | ............................. 123/276 |
| 6,779,511 | B2 | * | 8/2004 | Tonetti et al. | ............... 123/480 |
| 6,907,861 | B2 | * | 6/2005 | Asano et al. | ................ 123/395 |
| 7,054,734 | B2 | * | 5/2006 | Todoroki et al. | ........... 701/105 |
| 7,317,983 | B2 | * | 1/2008 | Ishizuka et al. | ............ 701/103 |

FOREIGN PATENT DOCUMENTS

| EP | 1 445 455 A2 | 8/2004 |
| EP | 1 760 299 A1 | 3/2007 |
| EP | 1 793 110 A2 | 6/2007 |
| JP | 2005-171818 A | 6/2005 |
| WO | 2005/119034 A1 | 12/2005 |

* cited by examiner

*Primary Examiner*—Willis R. Wolfe, Jr.
*Assistant Examiner*—Johnny H. Hoang
(74) *Attorney, Agent, or Firm*—Arent Fox LLP

(57) ABSTRACT

A control system for an internal combustion engine having fuel injectors for injecting fuel into a combustion chamber of the engine. A fuel property is estimated based on a combustion state of the fuel injected into at least one cylinder of the engine. The fuel injectors are controlled so that a specific amount of fuel is injected into the at least one cylinder and an amount of fuel corresponding to an operating condition of the engine is injected into cylinders other than the at least one cylinder. An additional fuel injection is performed after the fuel injection of the specific amount with respect to the at least one cylinder, for example, when a torque difference parameter indicative of a difference between a torque generated by the at least one cylinder and a torque generated by the other cylinders is equal to or greater than a predetermined threshold value.

8 Claims, 10 Drawing Sheets

*FIG. 6*
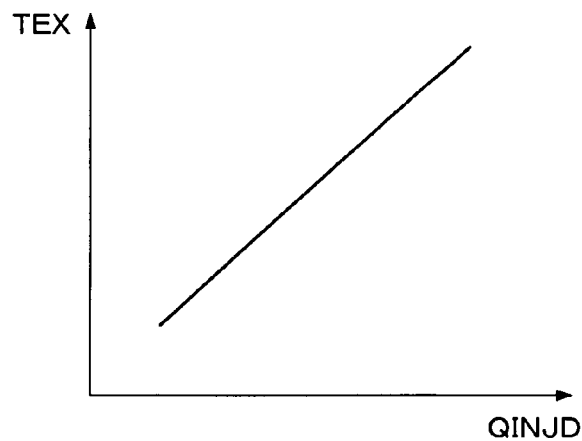
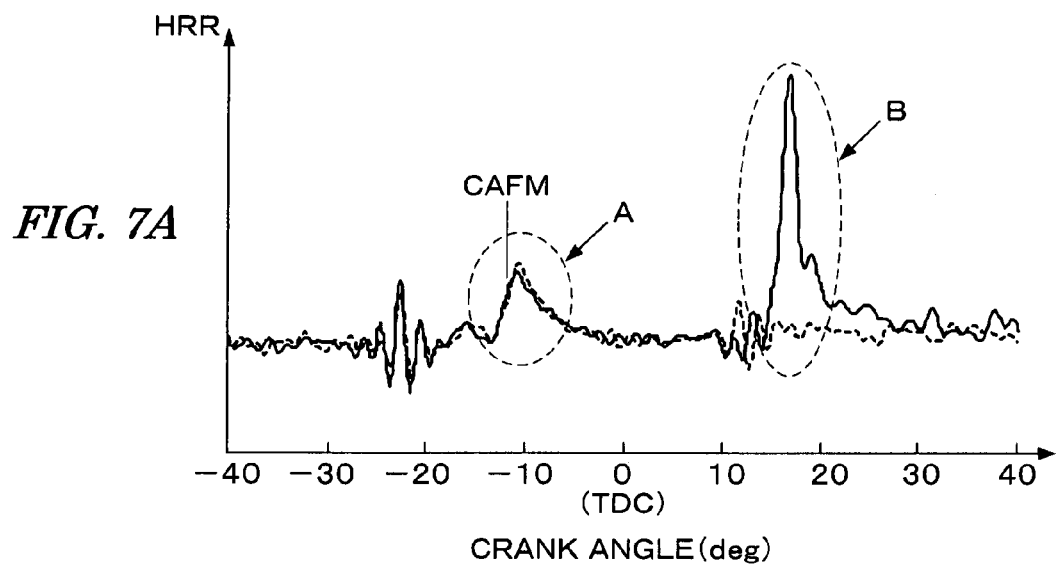
*FIG. 7A*
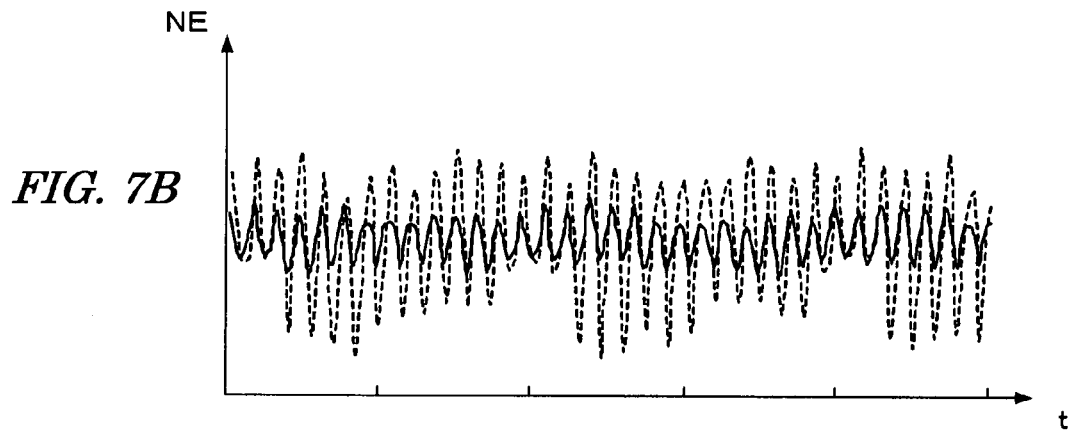
*FIG. 7B*

CONTROL SYSTEM FOR INTERNAL COMBUSTION ENGINE

BACKGROUND OF THE INVENTION

1. Field of the Invention

The present invention relates to a control system for an internal combustion engine and, particularly, to a control system which estimates a fuel property of the fuel in use.

2. Description of the Related Art

Japanese Patent Laid-open No. 2005-171818 discloses a control system for a compression ignition internal combustion engine in which a premix combustion is performed. According to the disclosed system, an actual ignition timing of the fuel is detected when the premix combustion is being performed, and a property of the fuel in use is determined according to an ignition timing error and a variation of the ignition timing error. The ignition timing error is a difference between the detected ignition timing and a previously set reference fuel ignition timing.

When determining a fuel property based on a combustion state of the injected fuel, it is preferable to prevent the determination accuracy from deteriorating. To achieve such a goal, a fuel injection amount for the cylinder that is used to estimate the fuel property should be maintained at a constant value. However, it is necessary to increase the fuel injection amount for the other cylinders, that are not used to estimate the fuel property, in order to operate the engine according to a demanded load on the engine. Therefore, the difference between a torque generated by the cylinder used to estimate the fuel property and a torque generated by the other cylinders becomes large and may cause an unpleasant vibration in the engine.

Further, when the estimation of fuel property is performed during an idling condition of the engine, for example, it is necessary to control a fuel injection amount so that the engine rotational speed is kept at a substantially constant speed. For example, when using one cylinder for the estimation of fuel property in the case of a four-cylinder engine, it is necessary to keep the engine rotational speed constant by controlling the fuel injection amount in the other three cylinders. In this case, when the load on the engine is comparatively great (i.e., the engine is operating in a high-load idling condition), such as when an air conditioner driven by the engine is operating or the shift position of the automatic transmission is set to the D-range (i.e., drive range), the difference between the torque generated by the cylinder used to determine the estimation of fuel property and the torque generated by each of the other cylinders becomes large and may cause the unpleasant vibration as described above. FIG. 14 shows a fuel injection amount QINJ of each cylinder when the engine is operating in the high-load idling condition. In the example shown in FIG. 14, the cylinder #1 is used for the estimation of fuel property (the fuel injection amount is fixed), and the fuel injection amount corresponding to each of the other cylinders #2 to #4 is controlled to keep the engine rotational speed at the constant value. As shown in FIG. 14, the vibration synchronized with the combustion cycle (two rotations of the crankshaft) increases if the difference in the fuel injection amount QINJ of each cylinder becomes relatively large.

SUMMARY OF THE INVENTION

The present invention was made contemplating the above-described points. An aspect of the invention is to provide a control system for an internal combustion engine which performs a process for estimating a fuel property of the fuel in use in a low-load operating condition of the engine to make it possible to obtain an accurate estimated result while preventing the unpleasant vibration of the engine.

To attain the above-described aspect, the present invention provides a control system for an internal combustion engine that has fuel injection means for injecting fuel into the combustion chambers of the internal combustion engine. The control system includes fuel property estimating means and fuel injection control means. The fuel property estimating means estimates a fuel property (CET) based on a combustion state of the fuel injected into a first cylinder (#1) of the engine. The fuel injection control means controls the fuel injection means so that a specific amount of fuel (QFIX) is injected into the first cylinder (#1) and an amount of fuel corresponding to an operating condition of the engine is injected into the other cylinders (#2 to #4). The fuel injection control means performs an additional fuel injection after the fuel injection of the specific amount (QFIX) with respect to the first cylinder (#1) when at least one of the following conditions 1) to 3) is satisfied:

1) a demand torque (TRQ) of the engine is equal to or greater than a predetermined value (TRQTH);
2) a fuel injection amount (QINJ) corresponding to the other cylinders is equal to or greater than a predetermined amount (QINJTH); and
3) a torque difference parameter (DQINJ, RDQINJ, RQINJ, WDNE) indicative of a difference between a torque generated by the first cylinder and a torque generated by the other cylinders is equal to or greater than a predetermined threshold value (DQTH, RDQTH, RQINJTH, WDNETH).

With the above-described structural configuration, the fuel property is estimated based on the combustion state of the fuel injected into the first cylinder of the engine. With respect to the first cylinder from which the estimation of fuel property is performed, a specific amount of fuel is injected. On the other hand, with respect to the other cylinders, the amount of fuel corresponding to the engine operating condition is injected. When at least one of the conditions 1) to 3) described above is satisfied, the additional fuel injection is performed after the fuel injection of the specific amount into the first cylinder. Therefore, the estimation of fuel property is accurately performed based on the combustion state of the injected fuel of the specific amount, and the torque generated by the first cylinder is increased by the additional fuel injection, thereby preventing the unpleasant vibration of the engine.

Preferably, the fuel injection control means controls the fuel injection amount (QINJ) corresponding to the other cylinders (#2 to #4) according to the load (TRQ) on the engine.

With the above-described structural configuration, the fuel injection amount corresponding to the other cylinders is controlled according to the load on the engine. Accordingly, the vibration of the engine due to the differences in the torques generated by the cylinders is prevented, and the torque is generated according to the load on the engine. Therefore, stable engine rotation is maintained. For example, in the idling condition of the engine, the fuel injection amount corresponding to the other cylinders is controlled so that the engine rotational speed becomes substantially constant. Therefore, any unpleasant vibration of the engine is prevented during the high-load idling condition of the engine, and a stable idling rotation is maintained.

Preferably, the engine has an exhaust gas recirculation means for recirculating a portion of exhaust gases to an intake system of the engine, and the fuel property estimating means detects a compression ignition timing (CAFM) of the injected fuel; the detected compression ignition timing is corrected according to a temperature (TEGR) of the exhaust gases recirculated by the exhaust gas recirculation means; and the estimation of fuel property is performed based on the corrected compression ignition timing.

With the above-described structural configuration, the compression ignition timing of the injected fuel is corrected according to the temperature of the recirculated exhaust gases and the fuel property is estimated based on the corrected compression ignition timing. Accordingly, an accurate fuel property estimation is performed even when such an estimation is performed after the engine transitions from the high-load operating condition to the low-load operating condition or the idling operating condition.

Preferably, the fuel property estimating means detects the temperature (TEGR) of the recirculated exhaust gases; delays the detected temperature by a predetermined time period (TDLY); and performs the correction according to the delayed temperature (TEGRD) of the recirculated exhaust gases.

With the above-described structural configuration, the detected temperature of the recirculated exhaust gases is delayed and the correction is performed according to the delayed temperature of the recirculated exhaust gases. Since there is a time delay until the ignition timing actually changes from the time of change in the recirculated exhaust gas temperature, a more accurate correction is performed by using the delayed temperature of the recirculated exhaust gases.

BRIEF DESCRIPTION OF THE DRAWINGS

FIG. 6 shows a table for calculating an estimated exhaust gas temperature (TEX) according to the fuel injection amount (QINJD);

FIGS. 7A and 7B are time charts illustrating changes in the heat release rate (HRR) and fluctuations in the engine rotational speed;

DETAILED DESCRIPTION OF THE PREFERRED EMBODIMENTS

Preferred embodiments of the present invention will now be described with reference to the drawings.

Figure 1:
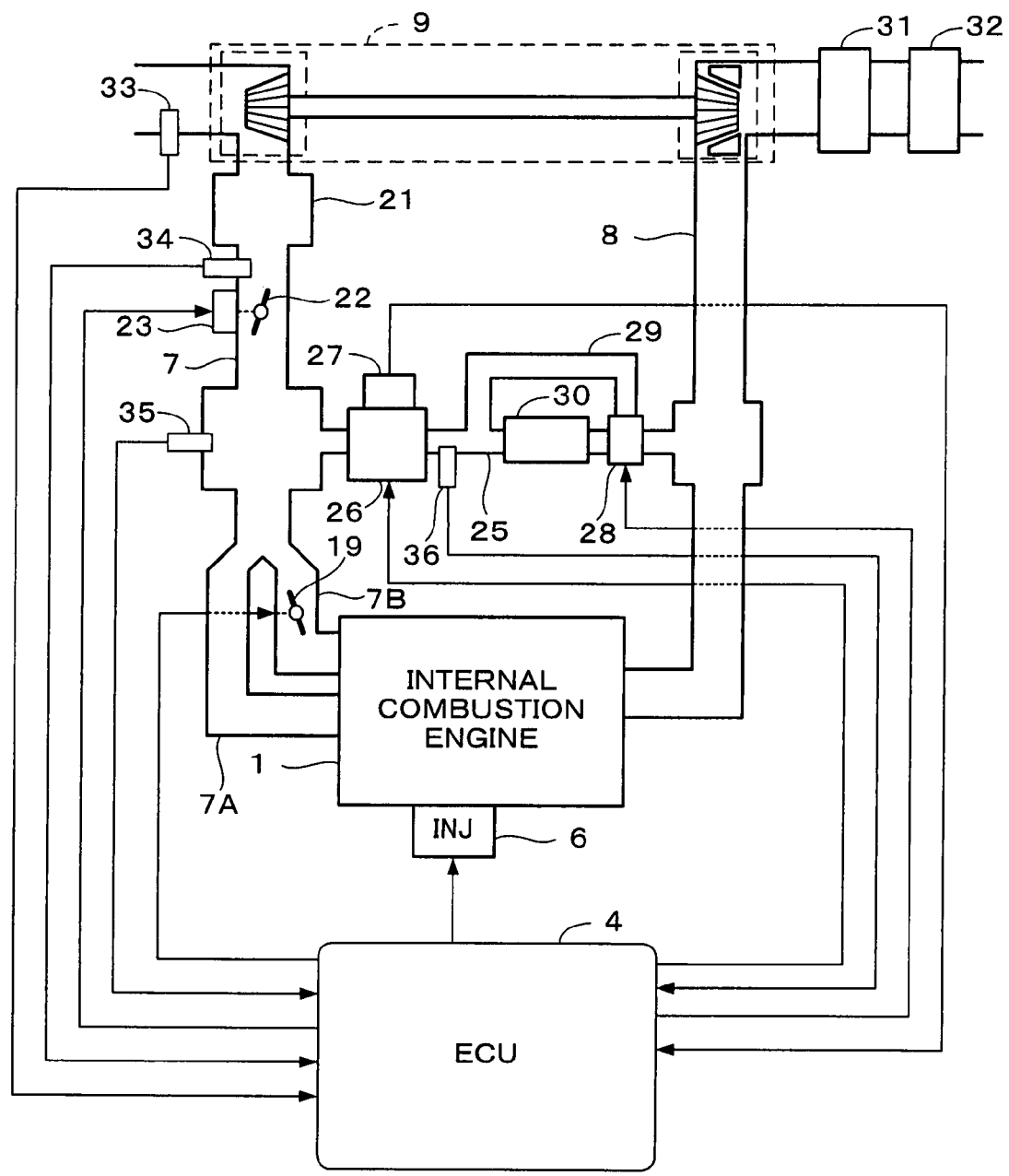
FIG. 1 shows a schematic diagram of an internal combustion engine and a control system therefor according to one embodiment of the present invention.
Figure 2:
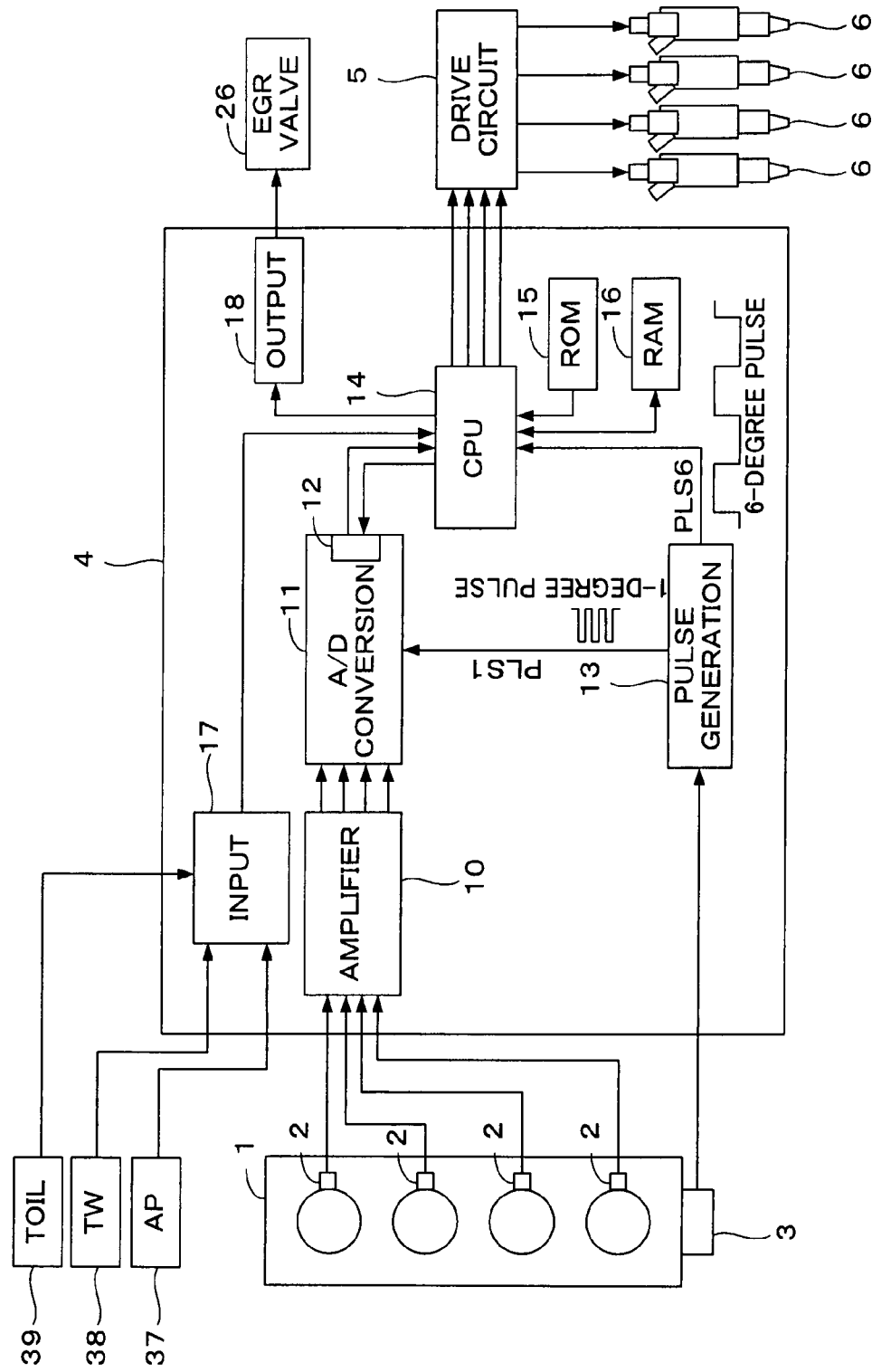
FIG. 2 shows a schematic diagram of a part of the control system shown in FIG. 1.

FIGS. 1 and 2 are schematic diagrams showing a configuration of an internal combustion engine and a control system therefor according to one embodiment of the present invention. The embodiment will be described referring to FIGS. 1-2. The internal combustion engine 1 (hereinafter referred to as "engine") is a diesel engine wherein fuel is injected directly into the cylinders. Each cylinder is provided with a fuel injection valve 6 that is electrically connected to an electronic control unit (hereinafter referred to as "ECU 4"). The ECU 4 controls a valve opening timing and a valve opening period of each fuel injection valve 6. That is, the fuel injection timing and the fuel injection period are controlled by the ECU 4.

The engine 1 has an intake pipe 7, an exhaust pipe 8, and a turbocharger 9. The turbocharger 9 includes a turbine rotationally driven by the kinetic energy of exhaust gases and a compressor connected to the turbine via a shaft. The turbocharger 9 pressurizes (compresses) the intake air of the engine 1.

The intake pipe 7 is provided with an intercooler 21 downstream of the compressor and a throttle valve 22 downstream of the intercooler 21. The throttle valve 22 is configured to open and close by an actuator 23 connected to the ECU 4. The ECU 4 controls an opening of the throttle valve 22 through the actuator 23.

The intake pipe 7 branches out to intake pipes 7A and 7B on the downstream side of the throttle valve 22 and further branches out to each corresponding cylinder. FIG. 1 shows a representative configuration having one cylinder. Each cylinder of the engine 1 is provided with two intake valves (not shown) and two exhaust valves (not shown). Two intake ports (not shown), which are opened and closed by the two intake valves, are connected, respectively, to the intake pipes 7A and 7B.

Further, a swirl control valve 19 (hereinafter referred to as "SCV") is disposed in the intake pipe 7B. The SCV 19 restricts an amount of air sucked through the intake pipe 7B to generate a swirl in the combustion chamber of the engine 1. The SCV 19 is a butterfly valve driven by an actuator (not shown) and the valve opening is controlled by the ECU 4.

An exhaust gas recirculation passage 25 for recirculating exhaust gases to the intake pipe 7 is provided between the exhaust pipe 8 and the intake pipe 7. The exhaust gas recirculation passage 25 is provided with a recirculated exhaust gas cooler 30 for cooling recirculated exhaust gases, a bypass passage 29 for bypassing the recirculated exhaust gas cooler 30, a switching valve 28, and an exhaust gas recirculation control valve 26 (hereinafter referred to as "EGR valve"). The switching valve 28 switches between a state where the exhaust gas recirculation passage 25 is connected to the recirculated exhaust gas cooler 30 and a state where the exhaust gas recirculation passage 25 is connected to the bypass passage 29. The EGR valve 26 is an electromagnetic valve having a solenoid. A valve opening of the EGR valve is controlled by the ECU 4. The exhaust gas recirculation passage 25, the recirculated exhaust gas cooler 30, the bypass passage 29, the switching valve 28, and the EGR valve 26 define an exhaust gas recirculation mechanism. The EGR valve 26 is provided with a lift sensor 27 for detecting a valve opening LACT (valve lift amount). The detection signal of the lift sensor 27 is supplied to the ECU 4.

An intake air amount sensor 33, an intake air temperature sensor 34, and an intake pressure sensor 35 are disposed in the intake pipe 7. The intake air amount sensor 33 detects an intake air amount GA. The intake air temperature sensor 34 detects an intake air temperature TA. The intake pressure sensor 35 detects an intake pressure Pi. A recirculated exhaust gas temperature sensor 36 is disposed in the exhaust gas recirculation passage 25. The recirculated exhaust gas temperature sensor 36 detects a recirculated exhaust gas temperature TEGR. The sensors 33 to 36 are connected to the ECU 4, and the detection signals from the sensors 33 to 36 are supplied to the ECU 4.

A catalytic converter 31 and a particulate filter 32 are disposed downstream of the turbine in the exhaust pipe 8. The catalytic converter 31 promotes oxidation of hydrocarbon and CO in the exhaust gases. The particulate filter 32 traps particulate matter (which mainly consists of soot).

Each cylinder of the engine 1 is provided with a cylinder pressure sensor 2 for detecting a cylinder pressure (a pressure in the combustion chamber of the engine 1). In this embodiment, the cylinder pressure sensor 2 is configured in one body together with a glow plug disposed in each cylinder. The detection signal of the cylinder pressure sensor 2 is supplied to the ECU 4. The detection signal of the cylinder pressure sensor 2 corresponds to a differential signal (indicative of a change in the pressure) of the cylinder pressure PCYL with respect to the crank angle (time), and the cylinder pressure PCYL is obtained by integrating the output of the cylinder pressure sensor.

The engine 1 is provided with a crank angle position sensor 3 for detecting a rotation angle of the crankshaft (not shown) of the engine 1. The crank angle position sensor 3 generates one pulse for every one degree of the crank angle, and the pulse is supplied to the ECU 4. The crank angle position sensor 3 further generates a cylinder discrimination pulse at a predetermined crank angle for a specific cylinder of the engine 1, and supplies the cylinder discrimination pulse to the ECU 4.

An accelerator sensor 37 for detecting an operation amount AP of the accelerator pedal of the vehicle driven by the engine 1, a coolant temperature sensor 38 for detecting a coolant temperature TW of the engine 1, an oil temperature sensor 39 for detecting a temperature TOIL of lubricating oil of the engine 1, an oxygen concentration sensor (not shown) for detecting an oxygen concentration in exhaust gases, and the like, are connected to the ECU 4. The detection signals of these sensors are supplied to the ECU 4.

A control signal of the fuel injection valve 6 provided in the combustion chamber of each cylinder of the engine 1 is provided by the ECU 4 to a drive circuit 5. The drive circuit 5 is connected to the fuel injection valve 6 and supplies the driving signals according to the control signal from the ECU 4 to the fuel injection valve 6. Accordingly, fuel is injected into the combustion chamber of each cylinder at the fuel injection timing in accordance with the control signal output from the ECU 4. The fuel injection amount is controlled in accordance with the control signal from the ECU 4. The ECU 4 normally performs a pilot injection and a main injection with respect to one cylinder.

The ECU 4 includes an amplifier 10; an A/D conversion block 11; a pulse generation block 13 a CPU 14 (Central Processing Unit); a ROM 15 (Read Only Memory) for storing programs executed by the CPU 14; a RAM 16 (Random Access Memory) for storing calculation results, and the like; an input circuit 17; and an output circuit 18. The detection signal of the cylinder pressure sensor 2 is input to an amplifier 10. The amplifier 10 amplifies the input signal which is then sent to the A/D conversion block 11. The pulse signal output from the crank angle position sensor 3 is sent to the pulse generation block 13.

The A/D conversion block 11, which includes a buffer 12, converts the cylinder pressure sensor output from the amplifier 10 to a digital value $dp/d\theta$ (hereinafter referred to as "pressure change rate") and stores the converted digital value in the buffer 12. Specifically, a pulse signal PLS1 (hereinafter referred to as "one-degree pulse") having a crank angle period of one degree is supplied to the A/D conversion block 11 from the pulse generation block 13. The cylinder pressure sensor output is sampled at one-degree pulse PLS1 intervals to be converted to a digital value, and the digital value is stored in the buffer 12. The cylinder pressure PCYL is calculated by integrating the pressure change rate $dp/d\theta$.

A pulse signal PLS6 having a crank angle period of six degrees is supplied to the CPU 14 from the pulse generation block 13. The CPU 14 reads the digital value stored in the buffer 12 at intervals of the six-degree pulse PLS6. That is, in the present embodiment, the A/D conversion block 11 does not request an interrupt of the CPU 14, but the CPU 14 performs the reading process at intervals of the six-degree pulse PLS6.

The input circuit 17 converts the detection signals from various sensors to digital values and supplies the digital values to the CPU 14. An engine rotational speed NE is calculated from the time period of the six-degree pulse PLS6. A demand torque TRQ of the engine 1 is calculated according to the operation amount AP of the accelerator pedal.

The CPU 14 calculates a target exhaust gas recirculation amount GEGR according to the engine operating condition and supplies a duty control signal for controlling an opening of the EGR valve 26 according to the target exhaust gas recirculation amount GEGR to the EGR valve 26 through the output circuit 18. Further, the CPU 14 estimates a cetane number of the fuel in use as described below and performs a fuel injection control according to the estimated cetane number.

Figure 3:
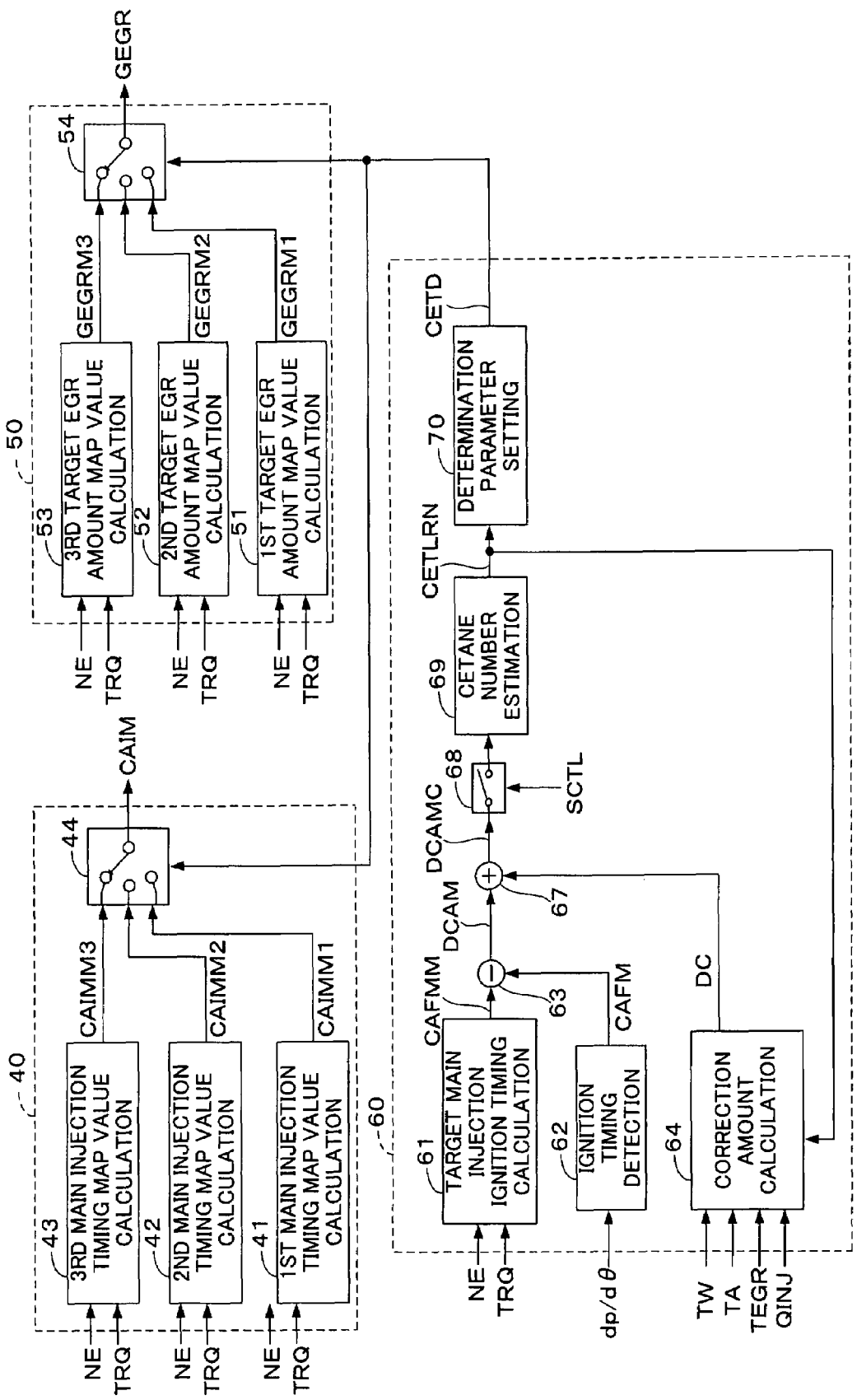
FIG. 3 is a block diagram showing a configuration of a module for calculating a main injection timing (CAIM) and a target exhaust gas recirculation amount (GEGR)

FIG. 3 is a block diagram showing a configuration of a module which calculates a main injection timing CAIM of the fuel injection valve 6 and the target exhaust gas recirculation amount GEGR. The function of this module is implemented by the processes executed by the CPU 14.

The module shown in FIG. 3 includes a main injection timing calculation block 40, a target exhaust gas recirculation amount calculation block 50, and a determined cetane number parameter generation block 60. The main injection timing calculation block 40 calculates the main injection timing CAIM. The target exhaust gas recirculation amount calculation block 50 calculates the target exhaust gas recirculation amount GEGR. The determined cetane number parameter generation block 60 estimates the cetane number CET of the fuel in use and outputs a determined cetane number parameter CETD according to the estimated cetane number. In this embodiment, the cetane number of the fuel in use is determined to be any one of a first cetane number CET1 (e.g., 41), a second cetane number CET2 (e.g., 47), or a third cetane number CET3 (e.g., 57), contemplating the cetane numbers of the fuels distributed in the market. The fuel injection timing control and the exhaust gas recirculation control are performed according to the determined cetane number. The determined cetane number parameter CETD takes values of "1" to "3" corresponding to the first-to-third cetane numbers CET1 to CET3. The second cetane number CET2 is equal to an average value of cetane numbers of the available fuels distributed in the market.

The main injection timing calculation block 40 consists of a first main injection timing map value calculation block 41, a second main injection timing map value calculation block 42, a third main injection timing map value calculation block 43, and a switching block 44.

The first main injection timing map value calculation block 41 retrieves a CAIMM1 map, which is previously set according to the engine rotational speed NE and the demand torque TRQ, to calculate a first main injection timing map value CAIMM1. The CAIMM1 map is set based on the fuel of the first cetane number CET1. The second main injection timing map value calculation block 42 retrieves a CAIMM2 map, which is previously set according to the engine rotational speed NE and the demand torque TRQ, to calculate a second main injection timing map value CAIMM2. The CAIMM2 map is set based on the fuel of the second cetane number CET2. The third main injection timing map value calculation block 43 retrieves a CAIMM3 map, which is previously set according to the engine rotational speed NE and the demand torque TRQ, to calculate a third main injection timing map value CAIMM3. The CAIMM3 map is set based on the fuel of the third cetane number CET3.

The switching block 44 selects any one of the first-to-third main injection timing map values CAIMM1 to CAIMM3 according to the determined cetane number parameter CETD. Specifically, if the determined cetane number parameter CETD is equal to "1", the first main injection timing map value CAIMM1 is selected; if the determined cetane number parameter CETD is equal to "2", the second main injection timing map value CAIMM2 is selected; and if the determined cetane number parameter CETD is equal to "3", the third main injection timing map value CAIMM3 is selected. Since the fuel injection timing is advanced as the cetane number of the fuel decreases, the relationship of CAIMM1>CAIMM2>CAIMM3 is satisfied when the engine operating condition is the same.

The target exhaust gas recirculation amount calculation block 50 includes a first target EGR amount map value calculation block 51, a second target EGR amount map value calculation block 52, a third target EGR amount map value calculation block 53, and a switching block 54.

The first target EGR amount map value calculation block 51 retrieves a GEGRM1 map, which is previously set according to the engine rotational speed NE and the demand torque TRQ, to calculate a first target EGR amount GEGRM1. The GEGRM1 map is set based on the fuel of the first cetane number CET1. The second target EGR amount map value calculation block 52 retrieves a GEGRM2 map, which is previously set according to the engine rotational speed NE and the demand torque TRQ, to calculate a second target EGR amount GEGRM2. The GEGRM2 map is set based on the fuel of the second cetane number CET2. The third target EGR amount map value calculation block 53 retrieves a GEGRM3 map, which is previously set according to the engine rotational speed NE and the demand torque TRQ, to calculate a third target EGR amount GEGRM3. The GEGRM3 map is set based on the fuel of the third cetane number CET3.

The switching block 54 selects any one of the first-to-third target EGR amount map values GEGRM1 to GEGRM3 according to the determined cetane number parameter CETD. Specifically, if the determined cetane number parameter CETD is equal to "1", the first target EGR amount map value GEGRM1 is selected, if the determined cetane number parameter CETD is equal to "2", the second target EGR amount map value GEGRM2 is selected, and if the determined cetane number parameter CETD is equal to "3", the third target EGR amount map value GEGRM3 is selected. Since the target EGR amount decreases as the cetane number of the fuel decreases, the relationship GEGRM1<GEGRM2<GEGRM3 is satisfied when the engine operating condition is the same.

The determined cetane number parameter generation block 60 includes a target main injection ignition timing calculation block 61, an ignition timing detection block 62, a subtracting block 63, a correction amount calculation block 64, an adding block 67, a switching block 68, a cetane number estimation block 69, and a determination parameter setting block 70.

The target main injection ignition timing calculation block 61 retrieves a CAFMM map, which is previously set according to the engine rotational speed NE and the demand torque TRQ, to calculate a target main injection ignition timing CAFMM. The CAFMM map is set based on the fuel of the second cetane number CET2 (e.g., 47).

The ignition timing detection block 62 detects a main injection ignition timing CAFM according to the pressure change rate $dp/d\theta$ obtained by converting the output signal of the cylinder pressure sensor 2 to a digital value. Specifically, a heat release rate HRR [J/deg] is calculated by equation (1). The heat release rate HRR is integrated from the fuel injection timing CAIM to calculate an integrated value IHRR. A timing at which the integrated value IHRR reaches an ignition determination threshold value IHRRTH is determined to be the main injection ignition timing CAFM.

$$HRR = \kappa(\kappa-1) \times PCYL \times dV/d\theta + 1(\kappa-1) \times VCYL \times dp/d\theta \quad (3)$$

where $\kappa$ is a specific heat ratio of the air-fuel mixture, PCYL is a detected pressure in the cylinder, $dV/d\theta$ is a cylinder volume increasing rate [$m^3$/deg], VCYL is a cylinder volume, and $dp/d\theta$ is a pressure change rate [kPa/deg].

The subtracting block 63 subtracts the detected main injection ignition timing CAFM from the target main injection ignition timing CAFMM to calculate an ignition delay angle DCAM.

FIG. 7A is a time chart showing changes in the heat release rate HRR. In FIG. 7A, the solid line corresponds to an example in which an additional fuel injection described below is performed, and the dashed line corresponds to an example in which the additional fuel injection is not performed. The portion A in FIG. 7A indicates an increase in the heat release rate HRR by an ignition of the fuel injected for the cetane number estimation (i.e., the pilot injection is not performed as only the main injection is performed). Therefore, by appropriately setting the ignition determination threshold value IHRRTH, as shown in FIG. 7A, the ignition timing CAFM is determined.

The portion B in FIG. 7A indicates an increase in the heat release rate HRR by the combustion of the additionally injected fuel. By performing the additional fuel injection, the torque generated by the corresponding cylinder is increased without changing the ignition timing CAFM used for the cetane number estimation. The dashed line in FIG. 7B indicates fluctuations in the engine rotational speed NE when the additional fuel injection is not performed. By performing the additional fuel injection when the change in the engine rotational speed NE is comparatively large, the change in the engine rotational speed NE, i.e., the unpleasant engine vibration, is suppressed as shown by the solid line in FIG. 7B.

In this embodiment, the cetane number estimation process is performed during the idling condition of the engine 1 in order to perform the cetane number estimation promptly after refueling. In this case, the ignition timing CAFM changes depending on the engine operating condition immediately before transitioning to the idling condition. Therefore, in this embodiment, the ignition delay angle DCAM is corrected according to the recirculated exhaust gas temperature TEGR, an estimated exhaust gas temperature TEX, the coolant temperature TW, and the intake air temperature TA immediately before starting the cetane number estimation process to accurately perform the cetane number estimation regardless of the engine operating condition immediately before transitioning to the idling condition. In this embodiment, when performing the cetane number estimation process, the exhaust gas recirculation is stopped. However, the temperature of the intake pipe or the intake valve may sometimes become high depending on the engine operating condition (i.e., the running condition of the vehicle) immediately before transitioning to the idling condition. In order to improve the accuracy of the estimated cetane number in such a case, the correction of the ignition delay angle DCAM is performed according to the recirculated exhaust gas temperature TEGR.

The correction amount calculation block 64 calculates a correction amount DC according to the coolant temperature TW, the intake air temperature TA, the recirculated exhaust gas temperature TEGR, a fuel injection amount QINJ per one injection, and a cetane number learning value CETLRN as is described below. The adding block 67 adds the correction amount DC to the ignition delay angle DCAM to calculate a corrected ignition delay angle DCAMC.

The switching block 68 is on/off controlled by a switching control signal SCTL which is set in the process shown in FIG. 10 as is described below. Specifically, the switching block 68 is turned off when the switching control signal SCTL1 is equal to "0", and turned on when the switching control signal SCTL is equal to "1". The switching control signal is set to "1" when an execution condition of the cetane number estimation is satisfied.

Figure 8:
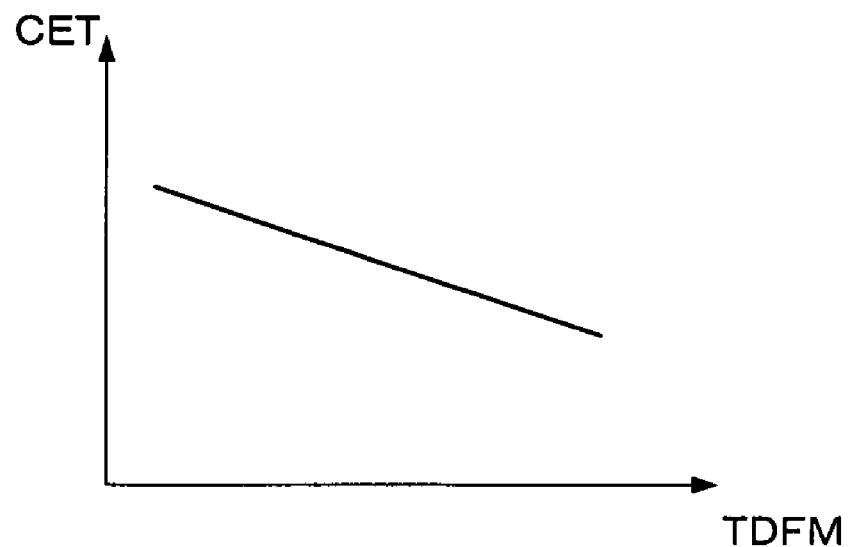
FIG. 8 shows a table for calculating the cetane number (CET) from an ignition delay time period (TDFM)

The cetane number estimation block 69 converts the corrected ignition delay angle DCAMC to an ignition delay time period TDFM using the engine rotational speed NE and retrieves a CET table (shown in FIG. 8) according to the ignition delay time period TDFM to calculate a cetane number CET. To calculate the cetane number learning value CETLRN, the cetane number estimation block 69 applies the cetane number CET to equation (2).

$$CETLRN = \alpha \times CET + (1-\alpha) \times CETLRN \quad (2)$$

where $\alpha$ is an averaging coefficient set to a value between "0" and "1", and the CETLRN on the right side of equation (2) is a preceding calculated value.

It is to be noted that when the cetane number estimation process is not executed, the latest cetane number learning value CETLRN of the stored learning values is output from the cetane number estimation block 69.

Figure 9:
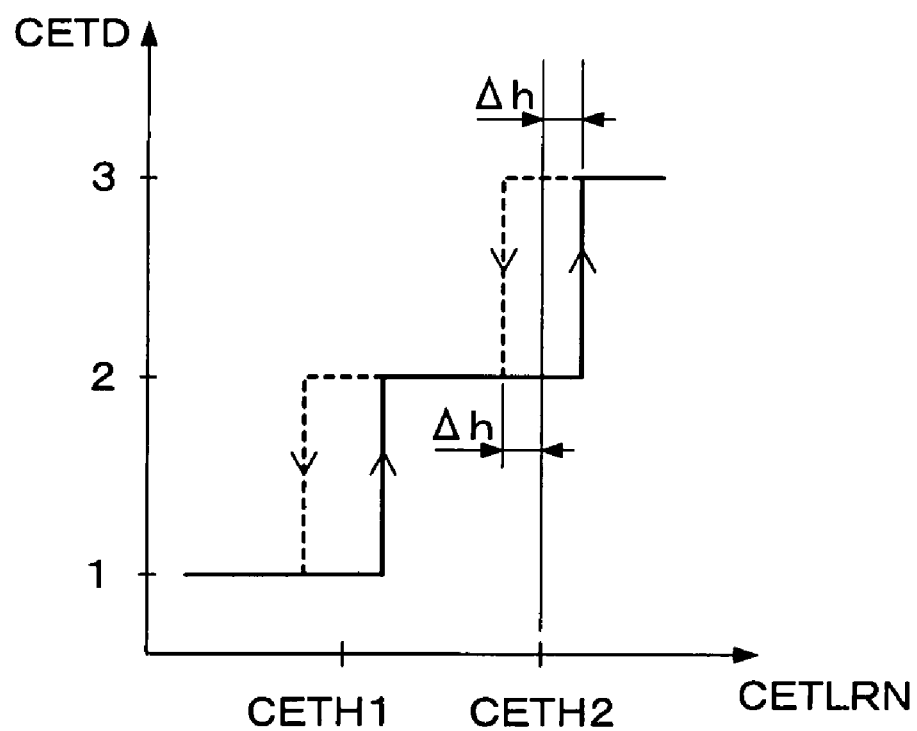
FIG. 9 illustrates a method of setting a determined cetane number parameter (CETD) according to a cetane number learning value (CETLRN)

The determination parameter setting block 70 sets the determined cetane number parameter CETD according to the cetane number learning value CETLRN. Specifically, as shown in FIG. 9, the cetane number learning value CETLRN is compared with a first threshold value CETH1 and a second threshold value CETH2 with hysteresis. That is, if a parameter (hereinafter referred to as "hysteresis parameter") for adding the hysteresis is indicated by "$\Delta h$", the determined cetane number parameter CETD is changed to "3" when the determined cetane number parameter CETD is equal to "2" and the cetane number learning value CETLRN exceeds the value obtained by adding the hysteresis parameter $\Delta h$ to the second threshold value CETH2. Further, the determined cetane number parameter CETD is changed to "2" when the determined cetane number parameter CETD is equal to "3" and the cetane number learning value CETLRN becomes lower than the value obtained by subtracting the hysteresis parameter $\Delta h$ from the second threshold value CETH2. With respect to the first threshold value CETH1, the similar determination is made to set the determined cetane number parameter CETD.

Figure 4:
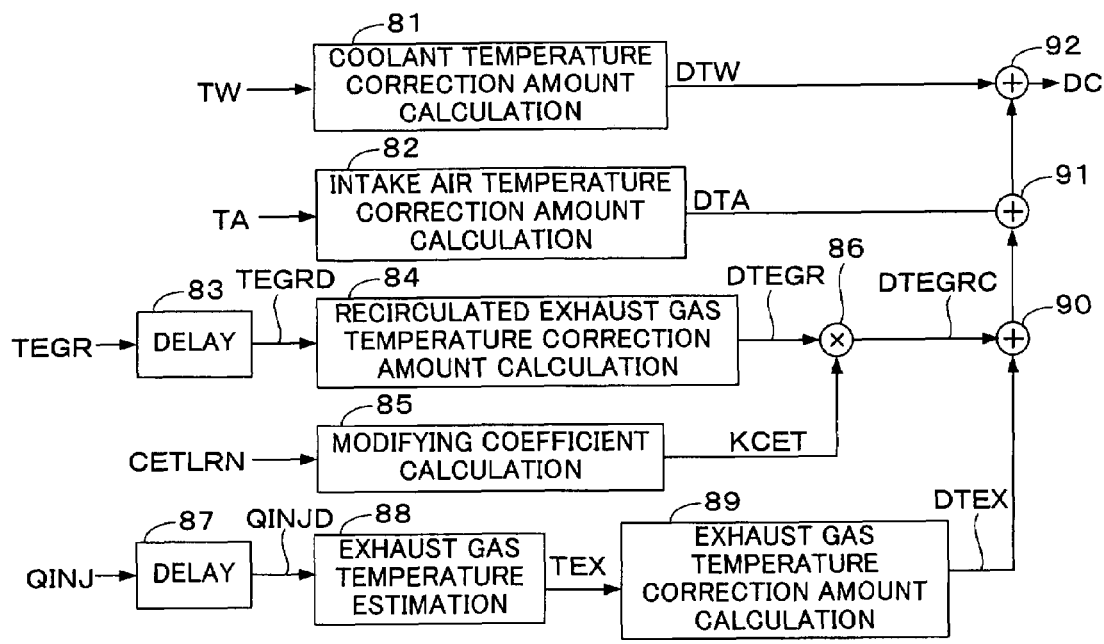
FIG. 4 is a block diagram showing a configuration of the correction amount calculation block shown in FIG. 3.

The correction amount calculation block 64 includes, as shown in FIG. 4, a coolant temperature correction amount calculation block 81, an intake air temperature correction amount calculation block 82, a delay block 83, a recirculated exhaust gas temperature correction amount calculation block 84, a modifying coefficient calculation block 85, a multiplying block 86, a delay block 87, an exhaust gas temperature estimation block 88, an exhaust gas temperature correction amount calculation block 89, and adding blocks 90, 91, and 92.

Figure 5A:
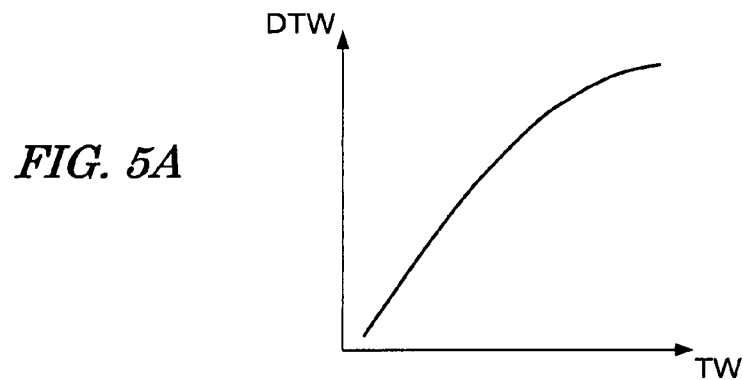
FIGS. 5A-5E show tables used in the calculation in each block of FIG. 4.
Figure 5B:
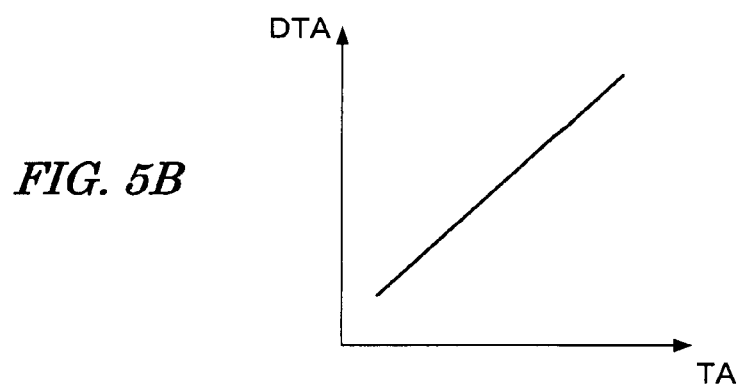

The coolant temperature correction amount calculation block 81 retrieves a DTW table (shown in FIG. 5A) according to the coolant temperature TW to calculate a coolant temperature correction amount DTW. The DTW table is set so that the correction amount DTW increases as the coolant temperature TW increases. The intake air temperature correction amount calculation block 82 retrieves a DTA table (shown in FIG. 5B) to calculate an intake air temperature correction amount DTA. The DTA table is set so that the correction amount DTA increases as the intake air temperature TA increases.

The delay block 83 delays a detected recirculated exhaust gas temperature TEGR by a predetermined time period TDLY to output a delayed recirculated exhaust gas temperature TEGRD. The predetermined time period TDLY is set to a time period corresponding to, for example, 100 combustion cycles (200 rotations) of the engine. Further, the delay block 87 delays the fuel injection amount QINJ by the predetermined time period TDLY to output a delayed fuel injection amount QINJD.

Figure 5C:
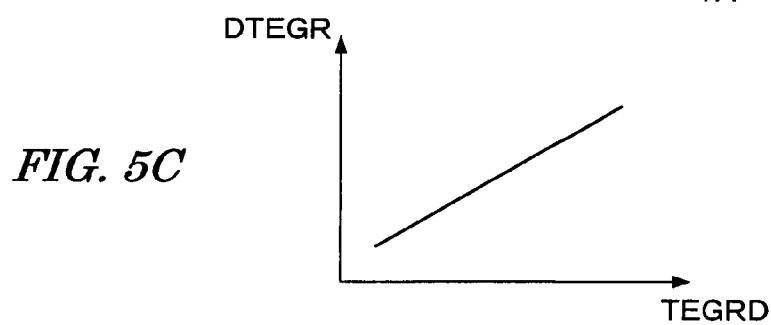
Figure 5D:
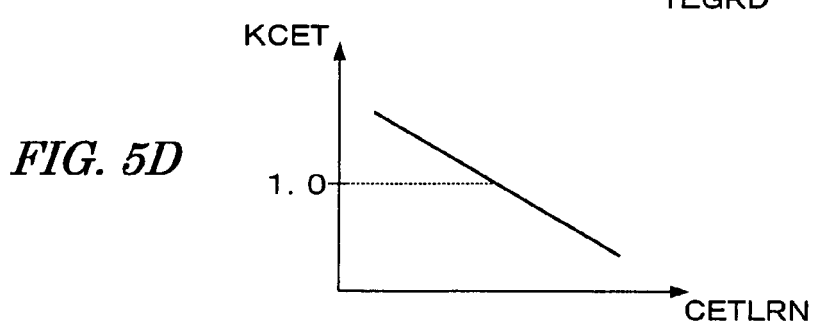

The recirculated exhaust gas temperature correction amount calculation block 84 retrieves a DTEGR table (shown in FIG. 5C) according to the delayed recirculated exhaust gas temperature TEGRD to calculate a recirculated exhaust gas temperature correction amount DTEGR. The DTEGR table is set so that the correction amount DTEGR increases as the delayed recirculated exhaust gas temperature TEGRD increases. The modifying coefficient calculation block 85 retrieves a KCET table (shown in FIG. 5D) according to the cetane number learning value CETLRN to calculate a modifying coefficient KCET. The KCET table is set so that the modifying coefficient KCET decreases as the cetane number learning value CETLRN increases (for example, when the cetane number learning value CETLRN is equal to "55", the recirculated exhaust gas temperature correction amount is set to a value which is reduced by about 50% from a value corresponding to the cetane number learning value CETLRN of "46"). The above setting of the KCET table is based on the fact that the change in the ignition timing due to the influence of the recirculated exhaust gas temperature TEGR becomes smaller as the cetane number of the fuel increases. The multiplying block 86 multiplies the modifying coefficient KCET by the recirculated exhaust gas correction amount DTEGR to calculate a modified recirculated exhaust gas correction amount DTEGRC.

Figure 5E:
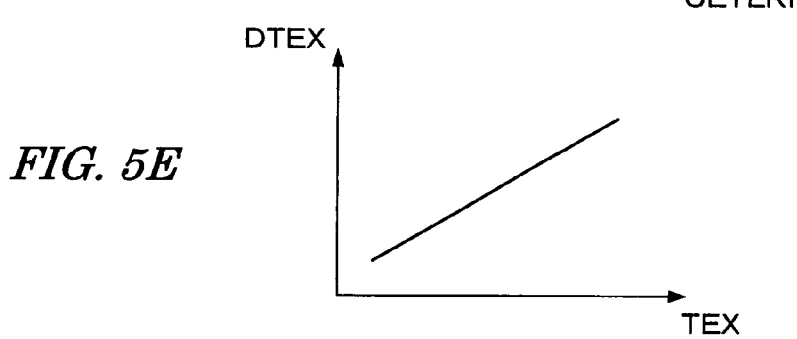

The delay block 87 delays the fuel injection amount QINJ by the predetermined time period TDLY to output a delayed fuel injection amount QINJD. The exhaust gas temperature estimation block 88 retrieves a TEX table shown in FIG. 6 according to the delayed fuel injection amount QINJD to calculate an estimated exhaust gas temperature TEX. The exhaust gas temperature correction amount calculation block 89 retrieves a DTEX table (shown in FIG. 5E) according to the estimated exhaust gas temperature TEX to calculate an exhaust gas temperature correction amount DTEX. The DTEX table is set so that the exhaust gas temperature correction amount DTEX increases as the estimated exhaust gas temperature TEX increases.

The TEX table is previously obtained experimentally. The exhaust gas temperature actually changes depending on the fuel injection amount and the engine rotational speed NE. In this embodiment, the cetane number estimation is performed in the idling condition and the engine rotational speed NE is kept at, for example, about 1000 rpm. Accordingly, the TEX table shown in FIG. 6 is applicable.

The adding blocks 90 to 92 perform a calculation using equation (3). That is, the coolant temperature correction amount DTW, the intake air temperature correction amount DTA, the modified recirculated exhaust gas temperature correction amount DTEGRC, and the exhaust gas temperature correction amount DTEX are added to calculate a correction amount DC.

$$DC=DTW+DTA+DTEGRC+DTEX \quad (3)$$

By adding the correction amount DC to the ignition delay angle DCAM, the cetane number estimation is accurately performed regardless of the operating condition immediately before transitioning to the idling condition. Further, by reducing the recirculated exhaust gas temperature correction amount DTEGR, wherein the cetane number learning value CETLRN increases to calculate the modified recirculated exhaust gas temperature correction amount DTEGRC, the correction is accurately performed. Further, since there is a delay until the ignition timing actually changes due to the influence of the recirculated exhaust gas temperature TEGR, the correction is performed more accurately by providing the delay block 83.

Figure 10:
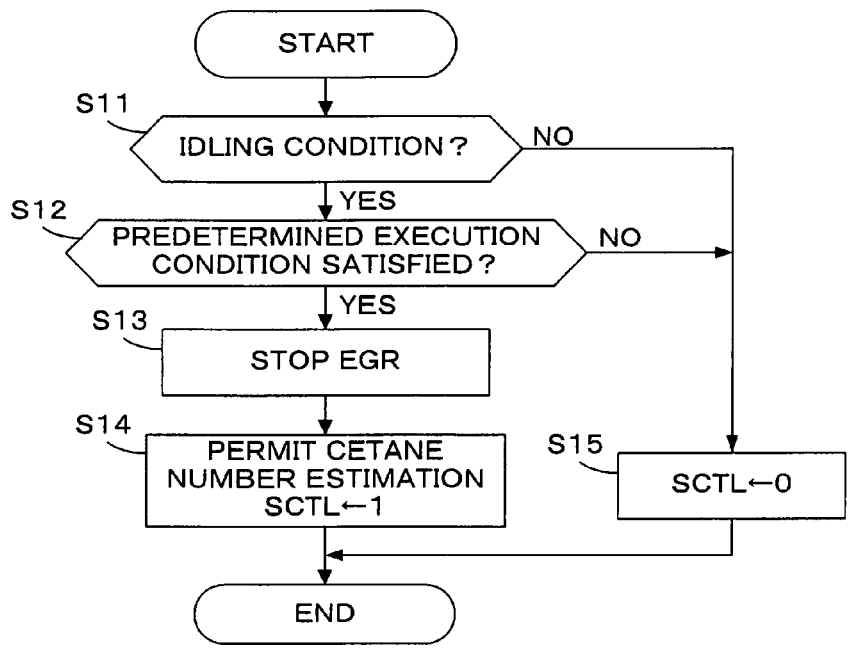
FIG. 10 is a flowchart of a process for setting the switching control signal (SCTL) shown in FIG. 3.

FIG. 10 is a flowchart showing a method of determining the execution condition of the cetane number estimation process and setting the switching control signal SCTL. The process shown in FIG. 10 is executed by the CPU 14 at predetermined time intervals.

In step S11, it is determined whether the engine 1 is in the idling condition. If the answer to step S11 is affirmative (YES), it is determined whether a predetermined execution condition for stably performing the cetane number estimation is satisfied. The predetermined execution condition is satisfied, for example, when the recirculated exhaust gas temperature TEGR is equal to or greater than a predetermined temperature TE0 (e.g., about 90 degrees centigrade) and the coolant temperature TW or the oil temperature TOIL, which are indicative of a warm-up condition of the engine 1, is equal to or higher than a predetermined temperature TWUP (e.g., 80 degrees centigrade).

If the answer to step S11 or S12 is negative (NO), the switching control signal SCTL is set to "0" (step S15).

In step S12, if the predetermined execution condition is satisfied, the EGR valve 26 is closed and the exhaust gas recirculation is stopped (step S13). By stopping the exhaust gas recirculation, the ignition timing is prevented from changing due to the influence of the recirculated exhaust gases, and accuracy of the cetane number estimation is improved. In step S14, the switching control signal SCTL is set to "1" and the process ends.

Figure 11:
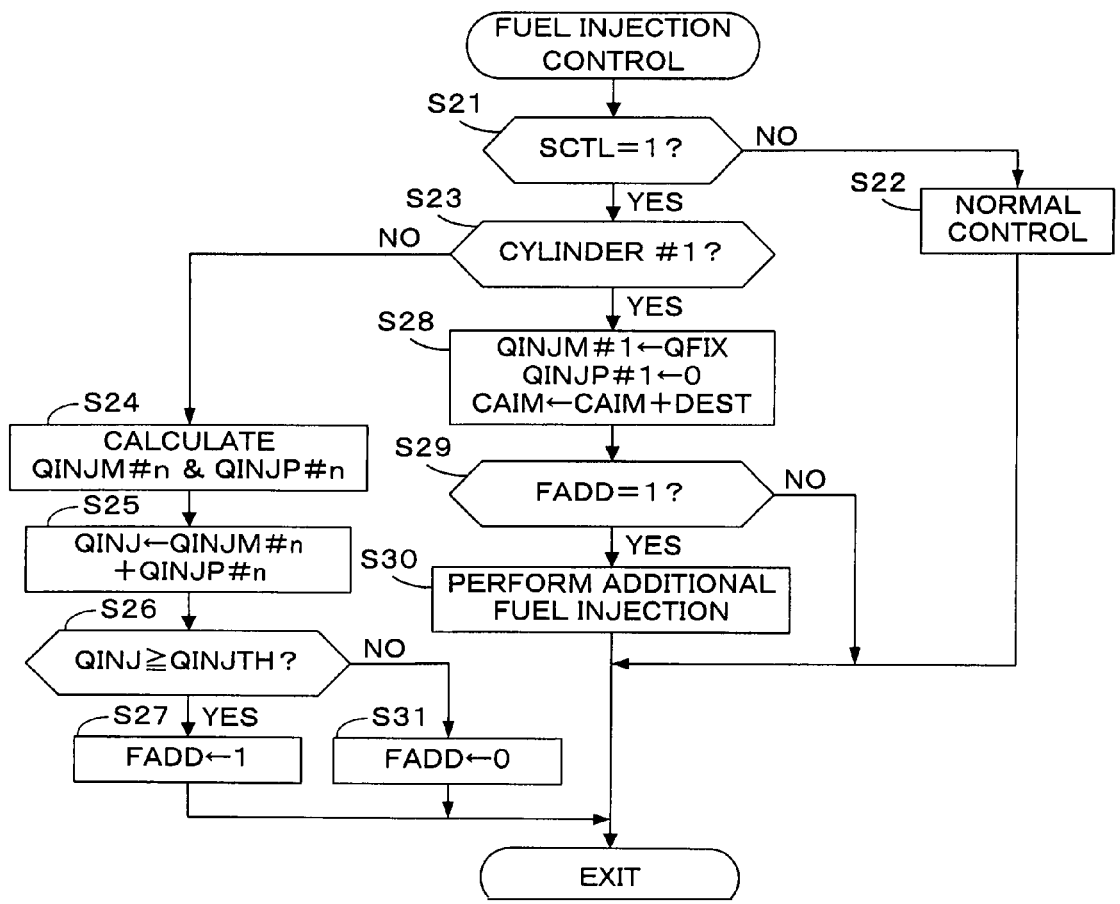
FIG. 11 is a flowchart showing a method of a fuel injection control process.

FIG. 11 is a flowchart showing a method of the fuel injection control process executed by the CPU 14 at every 180 degrees of the crank angle corresponding to the fuel injection of each cylinder. It is to be noted that, in this embodiment, the cetane number estimation is performed based on the ignition timing CAFM detected in cylinder #1 out of the four cylinders #1 to #4. Therefore, when performing the cetane number estimation, the fuel injection amount of cylinder #1 is fixed to a constant value, and the fuel injection amounts of the other cylinders #2 to #4 are controlled so that the engine rotational speed NE coincides with a target rotational speed NEIDL.

In step S21, it is determined whether the switching control signal SCTL is equal to "1". If the answer to step S21 is negative (NO), the normal control is executed (step S22).

That is, the main injection amount, the pilot injection amount, the main injection timing, and the pilot injection timing are calculated according to the engine rotational speed NE and the demand torque TRQ.

If SCTL is equal to "1" in step S21, i.e., when the cetane number estimation process is performed, it is determined whether the present controlled object cylinder is the cylinder #1 (step S23). If the object cylinder is not the cylinder #1, the main injection amount QINJM#n (n=2 to 4) and the pilot injection amount QINJP#n (n=2 to 4) are calculated so that the engine rotational speed NE coincides with the target rotational speed NEIDL (step S24). In the idling condition, the main injection timing CAIM and the pilot injection timing CAIP are respectively set to, for example, about seven degrees before the top dead center and about three degrees before the top dead center.

In step S24, the main injection amount QINJM#n and the pilot injection amount QINJP#n are added to calculate the fuel injection amount QINJ. In step S25, it is determined whether the fuel injection amount QINJ is equal to or greater than a predetermined injection amount QINJTH (e.g., 10 mg) (step S26). If the answer to step S26 is negative (NO), an additional injection flag FADD is set to "0" (step S31) and the process ends. If QINJ is equal to or greater than QINJTH, i.e., a difference between the fuel injection amount of the cylinder #n and the fuel injection amount of the cylinder #1 is large, the additional injection flag FADD is set to "1" (step S27).

In step S23, if the object cylinder is cylinder #1, the process proceeds to step S28, wherein the main injection amount QINJM#1 is set to a fixed injection amount QFIX (e.g., 6 mg) and the pilot injection amount QINJP#1 is set to "0". That is, only the main injection is performed. Further, the main injection timing CAIM is advanced by a predetermined angle DEST (e.g., advanced to a crank angle of 20 degrees before the top dead center). Thus, by performing only the main injection and advancing the main injection timing compared with that of the normal control, the difference in the ignition timing due to the difference in the cetane number becomes great. Accordingly, accuracy of the cetane number estimation based on the ignition timing is improved.

In step S29, it is determined whether the additional injection flag FADD is equal to "1". If the answer to step S29 is negative (NO), the process immediately ends. If FADD is equal to "1", which indicates that the difference between the torque generated by the cylinder #1 and the torque generated by each of the other cylinders is great, an additional fuel injection is performed after the main injection, for example, at the timing of 10 degrees after the top dead center (step S30). The additional fuel injection amount QIADD at this time is set to, for example, a difference (QINJ–QFIX) between the fixed injection amount QFIX and the fuel injection amount QINJ of other cylinders.

By performing the additional fuel injection, the heat release rate HRR changes as shown by the solid line in FIG. 7A, and fluctuations in the engine rotational speed NE are suppressed as shown by the solid line in FIG. 7B.

In the idling condition, the SCV 19 is normally fully closed. However, it is preferable to open the SCV 19 when performing the additional fuel injection. In this case, an opening of the SCV 19 is controlled so as to become greater as the additional fuel injection amount QIADD increases.

Figure 12A:
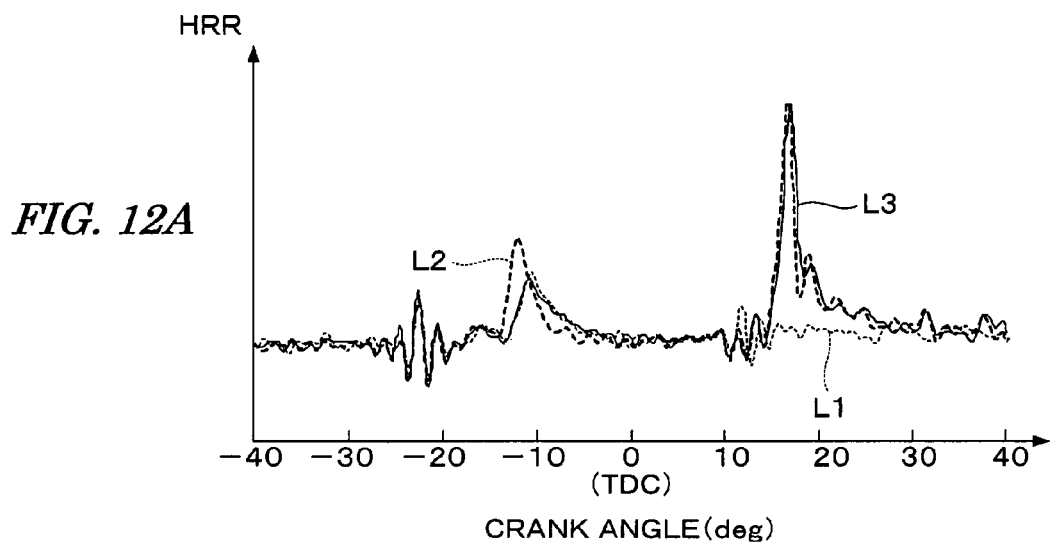
FIGS. 12A and 12B are time charts illustrating changes in the heat release rate (HRR)
Figure 12B:
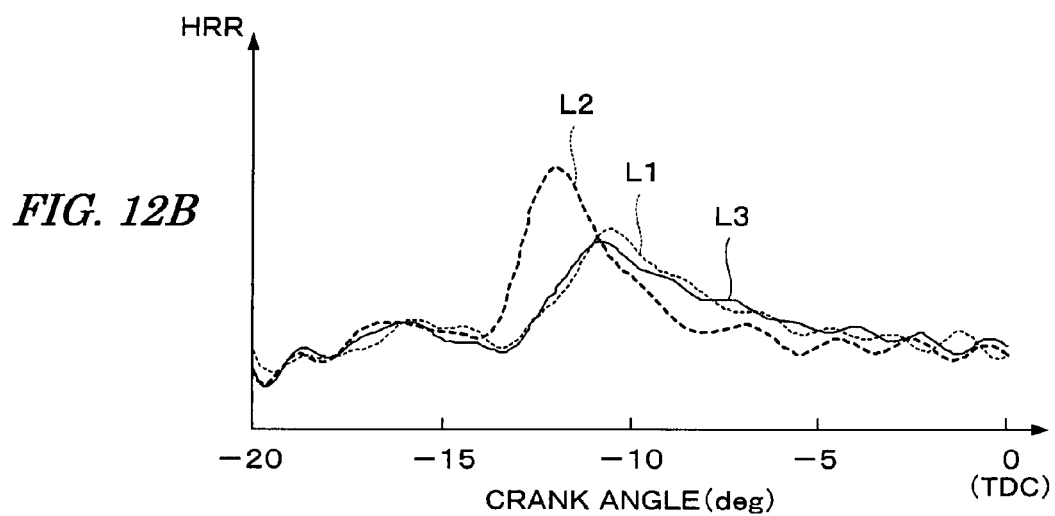

FIGS. 12A and 12B are time charts illustrating changes in the heat release rate HRR in cylinder #1 which is subjected to the cetane number estimation. FIG. 12B shows a part of FIG. 12A expanded in the angular direction (a range from −20 to 0 degrees of the crank angle). In FIGS. 12A and 12B, the thin dashed line L1 corresponds to a case where the additional fuel injection is not performed, the thick dashed line L2 corresponds to a case where the additional injection is performed and the SCV 19 is fully closed, and the solid line L3 corresponds to a case where the SCV 19 is opened. As apparent from FIGS. 12A and 12B, when the additional fuel injection is performed, opening the SCV19 changes the heat release rate HRR of a combustion corresponding to the main injection coinciding with the change in the heat release rate HRR corresponding to a case where the additional fuel injection is not performed. Accordingly, the accuracy of the cetane number estimation is maintained at the same level.

In this embodiment, the fuel injection valve 6 corresponds to the fuel injection means. The exhaust gas recirculation passage 25, the EGR valve 26, the switching valve 28, the bypass passage 29, and the recirculated exhaust gas cooler 30 define the exhaust gas recirculation means. The cylinder pressure sensor 2 defines a part of the fuel property estimating means, and the ECU 4 defines a part of the fuel property estimating means and the fuel injection control means. Specifically, the process of FIG. 11 corresponds to the fuel injection control means. Further, the target main injection ignition timing calculation block 61, the ignition timing detection block 62, the subtracting block 63, the correction amount calculation block 64, the adding block 67, and the cetane number estimation block 69 shown in FIG. 3 correspond to the fuel property estimating means.

The present invention is not limited to the embodiment described above and various modifications may be made. For example, in the above-described embodiment, the additional fuel injection is performed in cylinder #1 when the fuel injection amount QINJ of cylinders #2 to #4, which are not used for the cetane number estimation, becomes equal to or greater than the predetermined injection amount QINJTH. Alternatively, the additional fuel injection in cylinder #1 may be performed when a difference DQINJ (=QINJ−QINJM#1) between the fuel injection amount QINJ of cylinders #2 to #4 and the main injection amount QINJM#1 of cylinder #1 is equal to or greater than the predetermined amount DQTH, or when a ratio RDQINJ (=DQINJ/QINJ) of the difference DQINJ is equal to or greater than a predetermined ratio RDQTH, or when a ratio RQINJ (=QINJ/QINJM#1) of the fuel injection amount QINJ of cylinders #2 to #4 and the main injection amount QINJM#1 of cylinder #1 is equal to or greater than a predetermined ratio RQINJTH. Alternatively, the additional fuel injection may be performed in cylinder #1 when an amplitude WDNE of fluctuations in the engine rotational speed NE shown in FIG. 7B is equal to or greater than a predetermined amplitude WDNETH. The above-described parameters DQINJ, RDQINJ, RQINJ, and WDNE correspond to a torque difference parameter indicative of the difference between the torque generated by cylinder #1 and the torque generated by each of the other cylinders.

Further, the present invention is also applicable to a case where two cylinders instead of one cylinder are used for detecting the ignition timing to estimate the cetane number.

Further, in the embodiment described above, the ignition delay angle DCAM is corrected by the correction amount DC. Alternatively, the detected ignition timing CAFM may be corrected. In such a case, the correction is performed by subtracting the correction amount DC from the detected ignition timing CAFM.

Figure 13:
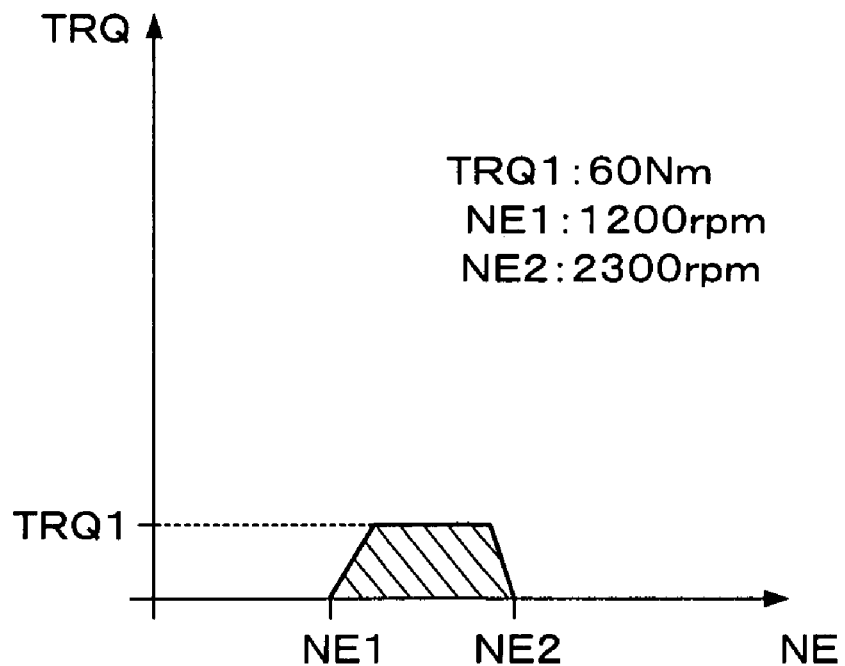
FIG. 13 shows the premix combustion region.
Figure 14:
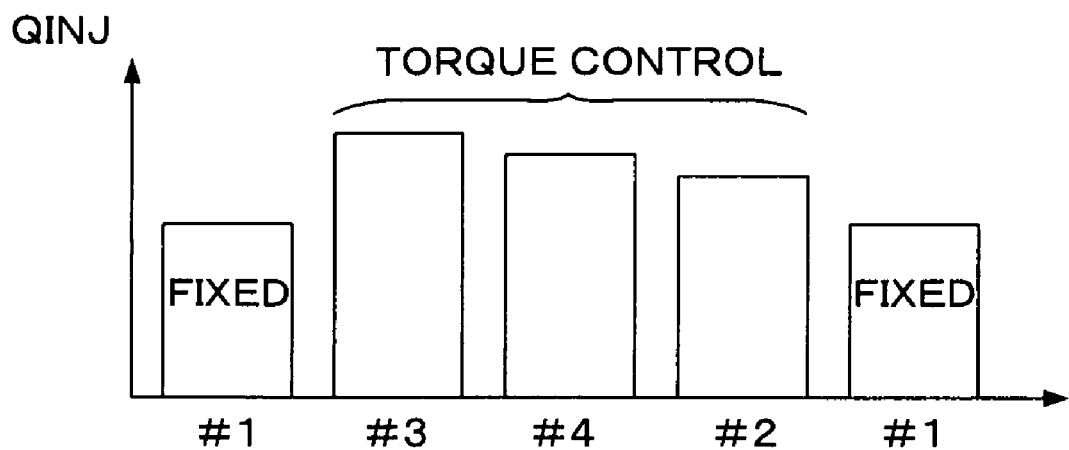
FIG. 14 shows the fuel injection amount (QINJ) of each cylinder.

Further, in the embodiment described above, the cetane number estimation process is performed during the idling condition of the engine 1. Alternatively, the cetane number estimation process may be performed in the premix combustion region illustrated in FIG. 13. In such a case, the main injection amount QINJM#n, the pilot injection amount QINJP#n, the main injection timing CAIM, and the pilot injection timing CAIP are calculated according to the engine rotational speed NE and the demand torque TRQ in step S24 of FIG. 11. In this case, the additional fuel injection in cylinder #1 may be performed when the demand torque TRQ is equal to or greater than a predetermined torque TRQTH.

Considering the above-described modifications, it is preferable to perform the additional fuel injection in cylinder #1 when at least one of the following conditions 1) to 3) is satisfied:

1) the demand torque TRQ is equal to or greater than the predetermined torque TRQTH;

2) the fuel injection amount QINJ of cylinders #2 to #4 is equal to or greater than the predetermined injection amount QINJTH; and 3) the torque difference parameters indicative of the difference between the torque generated by cylinder #1 and the torque generated by the other cylinders #2 to #4 are equal to or greater than the predetermined threshold value (DQTH, RDQTH, RQINJTH, WDNETH).

The present invention can be applied also to a control system for a watercraft propulsion engine such as an outboard engine having a vertically extending crankshaft.

The present invention may be embodied in other specific forms without departing from the spirit or essential characteristics thereof. The presently disclosed embodiments are therefore to be considered in all respects as illustrative and not restrictive, the scope of the invention being indicated by the appended claims, rather than the foregoing description, and all changes which come within the meaning and range of equivalency of the claims are, therefore, to be embraced therein.

What is claimed is:

1. A control system for an internal combustion engine having fuel injection means for injecting fuel into combustion chambers of said engine, said control system comprising:

fuel property estimating means for estimating a fuel property based on a combustion state of the fuel injected into at least one cylinder of said engine; and fuel injection control means for controlling said fuel injection means so that a specific amount of fuel is injected into the at least one cylinder and an amount of fuel corresponding to an operating condition of said engine is injected into other cylinders not including the at least one cylinder, wherein said fuel injection control means performs an additional fuel injection after the fuel injection of the specific amount with respect to the at least one cylinder when at least one of the following conditions 1) to 3) is satisfied:

1) a demand torque of said engine is equal to or greater than a predetermined value;

2) a fuel injection amount corresponding to said other cylinders is equal to or greater than a predetermined amount; and 3) a torque difference parameter indicative of a difference between a torque generated by the at least one cylinder and a torque generated by said other cylinders is equal to or greater than a predetermined threshold value.

2. A control system according to claim 1, wherein said fuel injection control means controls the fuel injection amount corresponding to said other cylinders according to a load on said engine.

3. A control system according to claim 1, wherein said engine has an exhaust gas recirculation means for recirculating a portion of exhaust gases to an intake system of said engine, and said fuel property estimating means detects a compression ignition timing of the injected fuel; corrects the detected compression ignition timing according to a temperature of the exhaust gases recirculated by said exhaust gas recirculation means; and performs the estimation of fuel property based on the corrected compression ignition timing.

4. A control system according to claim 3, wherein said fuel property estimating means detects the temperature of the recirculated exhaust gases; delays the detected temperature by a predetermined time period; and performs the correction according to the delayed temperature of the recirculated exhaust gases.

5. A control method for an internal combustion engine having fuel injectors for injecting fuel into combustion chambers of said engine, said control method comprising the steps of:

a) estimating a fuel property based on a combustion state of the fuel injected into at least one cylinder of said engine; and b) controlling said fuel injectors so that a specific amount of fuel is injected into the at least one cylinder and an amount of fuel corresponding to an operating condition of said engine is injected into other cylinders not including the at least one cylinder, wherein an additional fuel injection is performed after the fuel injection of the specific amount with respect to the at least one cylinder when at least one of the following conditions 1) to 3) is satisfied:

1) a demand torque of said engine is equal to or greater than a predetermined value;

2) a fuel injection amount corresponding to said other cylinders is equal to or greater than a predetermined amount; and 3) a torque difference parameter indicative of a difference between a torque generated by the at least one cylinder and a torque generated by said other cylinders is equal to or greater than a predetermined threshold value.

6. A control method according to claim 5, wherein the fuel injection amount corresponding to said other cylinders is controlled according to a load on said engine.

7. A control method according to claim 5, wherein said engine has an exhaust gas recirculation means for recirculating a portion of exhaust gases to an intake system of said engine, and said step a) includes the steps of:

i) detecting a compression ignition timing of the injected fuel;

ii) correcting the detected compression ignition timing according to a temperature of the exhaust gases recirculated by said exhaust gas recirculation means; and iii) performing the estimation of fuel property based on the corrected compression ignition timing.

8. A control method according to claim 7, wherein said step a) further includes the steps of:

iv) detecting the temperature of the recirculated exhaust gases;

v) delaying the detected temperature by a predetermined time period; and vi) performing the correction according to the delayed temperature of the recirculated exhaust gases.

* * * * *